Jan. 3, 1933.  R. M. WILHELM ET AL  1,892,689
UNIVERSAL SCALE DAIRY THERMOMETER
Filed Oct. 28, 1931
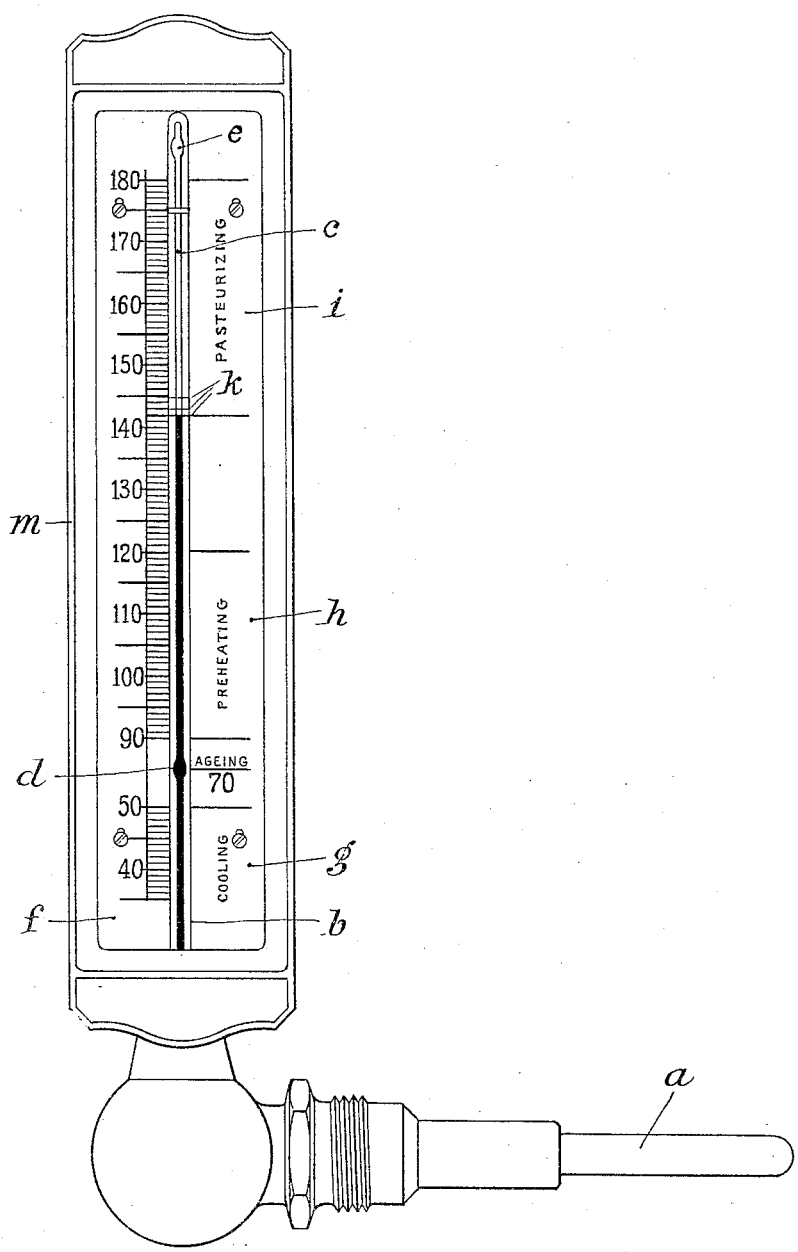
WITNESS
G. V. Rasmussen
INVENTORS
ROBERT M. WILHELM
DONALD C. LIGHTNER
BY
Biesen Schrenk
ATTORNEYS Patented Jan. 3, 1933

1,892,689

UNITED STATES PATENT OFFICE

ROBERT M. WILHELM, OF BROOKLYN, AND DONALD C. LIGHTNER, OF VALLEY STREAM, NEW YORK, ASSIGNORS TO CHARLES J. TAGLIABUE MFG. CO., OF BROOKLYN, NEW YORK, A CORPORATION OF NEW YORK

UNIVERSAL SCALE DAIRY THERMOMETER

Application filed October 28, 1931. Serial No. 571,530.

The invention relates to thermometers, such as are used in the temperature treatment of milk, cream, and the like, and the object of the invention is to supply a thermometer which, complying with all requirements of state and local health authorities, shall be compact, easily readable, and available for all the temperatures employed for any treatment to which dairy products are exposed.

The requirements of several state and local health authorities are that dairy thermometers shall have a graduated scale in single degree divisions of not less than $\frac{1}{16}$ of an inch. The ranges of temperature involved in dairy practice include cooling temperatures lying between 35° and 50°, an ageing temperature at 70°, a range from 90° to 180° for preheating and pasteurizing all forms of milk, creams, and ice-cream mix. The vats are required to be sterilized frequently, which means temperatures of up to approximately 220°. A thermometer having all the degrees marked thereon from 35° to 220° with the spacing of $\frac{1}{16}$ of an inch with the additional length required in the casing and support of the thermometer above and below the scale itself would necessitate a thermometer of such undue length as to be entirely impractical. The result is that it has been heretofore customary for operators of dairy plants to use auxiliary instruments for preheating, separating, pasteurizing, or cooling back in the vat. Thus, a thermometer meeting the health code requirements for $\frac{1}{16}$ inch divisions and graduated say 130° to 220° F. for pasteurizing, could not be used for preheating (90° to 120° F.) or cooling (30° to 50° F.). A temperature of 70° is also important for holding butter milk starters and cultures during the incubation period of 15 to 16 hours. The ordinary scale case used in dairy practice is a 7 inch or a 9 inch scale case of which the former can only accommodate about 90° of $\frac{1}{16}$ inch graduations, while the latter is limited to about 120°. These conditions and the necessity of employing separate instruments for the different operations conducted in the vat worked a hardship on the dairy plant operator.

The thermometer of the present invention embodies in a single instrument, within the 9 inch scale case limit, the entire gamut of readings required for any one of the sections of dairy temperature control and furnishes protection as well against sterilizing temperatures up to 220° F.

The instrument embodying the present invention is illustrated in the drawing which shows a front view of the new thermometer, it being understood that the degree divisions are all single degree divisions of not less than $\frac{1}{16}$ of an inch.

The thermometer illustrated in the drawing comprises a bulb which is adapted to be positioned within the vat, the position of said bulb being indicated at $a$. The bulb is filled with mercury or other expansible fluid and communicates with the glass thermometer tube $b$ having the usual capillary bore indicated at $c$. In the preferred form of the instrument a color contrast is provided for between the mercury in the bore and the bore where it contains no mercury. This may be effected in various ways, as for example by providing for a red color effect limited in width to the apparent width of the bore $c$ or by reflecting red or other vivid color upon the mercury so as to make the mercury appear red while the bore appears white. In the drawing the bore $c$ is to be conceived of as appearing as a red line above the level of the mercury wherever it may be.

The thermometer tube $b$ is provided with an expansion chamber $d$ blown therein at the region between 50° and 90° and in blowing this expansion chamber, care must be taken and measurements must be made to make sure that the 70° point falls within the limits of said chamber $d$. A second expansion chamber $e$ is blown in the tube above the 180° point for the accumulation of mercury as the column expands up to the sterilizing temperatures. The dimensions of the chamber $e$ should be such that the mercury will not rise above chamber $e$ when temperatures of the order of 220° F. are attained.

$f$ indicates the scale plate which at one side of the thermometer tube is graduated from 35° to 50° and 90° to 180°. At the other side of the thermometer the plate *f* is shown as provided with a mark of graduation designated as "ageing" and corresponding exactly to 70°, said graduation being within the limits of the expansion chamber *d*. To the right of the thermometer tube on the drawing the plate *f* is divided into panels *g*, *h*, and *i* respectively, said panels being delimitative, respectively, of the cooling range (up to 50°), the preheating range (90° to 120°) and the pasteurizing range (142° to 180°). These panels, *g*, *h*, and *i* are also provided with indicating means such as the words "cooling", "preheating" and "pasteurizing" to identify the panels with the several limited ranges of the several steps. Instead of using words, different colors may be employed, but preferably we use a scale plate which is of silver color with the indicating marks and lettering in black. *k* represent lines etched across the thermometer tube *b* at 142°, 143°, and 145°, such etching being a requirement of some of the laws dealing with the control of pasteurization.

The accurate preparation and assembly of the thermometer tube with the scale plate in proper juxtaposition for the indication of accurate temperatures corresponding to the rise of mercury in the thermometer tube is within the skill of the thermometer maker and is well understood by him.

It will be observed that the new thermometer complies fully with all the requirements of state and local health authorities and yet does not work any hardship on the dairy plant operator. It is no longer necessary to use auxiliary instruments for preheating, separating, pasteurizing, or cooling back in the vat since the new thermometer supplies in one instrument an easily read record in every working range. The thermometer illustrated in the drawing has a 9 inch scale case *m* within which all the combined working ranges with $\frac{1}{16}$ inch degree separations are accommodated, with the ageing range occupying but ¾ of an inch and having a line at exactly 70°, while the expansion chamber *e* furnishes protection against injury to the instrument upon exposure to sterilizing temperatures up to 220° F.

The economy of having every working range in one instrument is obvious. The device is compact, easy to handle, and very easy to read. One feature of this new thermometer, which is of particular interest to the small or medium sized dairy operator is its capacity for use on long-stem indicating thermometers for vat pasteurization. It is of great advantage where he is forced to cool in the vat. The instrument accordingly has the distinct advantage of being adaptable to multiple uses in dairy plant operation. The instrument further has the advantage of a handsome rugged construction to recommend it.

We claim:

1. A dairy thermometer comprising a bulb for placement in a vat, a thermometer tube connected with said bulb having a capillary bore for an expansible temperature-indicating fluid, said bore having an enlargement positioned in the regions between 50° and 90°, the 70° point being within the limits of said enlargement and having a further enlargement above the 180° point ample to accommodate the expanded temperature-indicating fluid in the sterilizing temperatures up to approximately 220° and a scale plate bearing a graduated scale in single degree divisions of not less than $\frac{1}{16}$ inch and bearing temperature indications in numerals for the ranges of temperatures used in dairy work for cooling, preheating, and pasteurizing, respectively, a line at 70° opposite the first named enlargement of the thermometer tube to indicate the temperature appropriate for ageing, and panels delimiting and marked to identify them respectively with at least cooling and pasteurizing ranges, all arranged and assembled within a scale case of limited length of the order of 9 inches.

2. A dairy thermometer comprising a bulb for placement in a vat, a thermometer tube connected with said bulb having a capillary bore for an expansible temperature-indicating fluid, the rear face of said bore for the entire length of the bore being color-affected so as to appear in brilliant color contrast with the temperature-indicating fluid and all those parts of the tube which are situated laterally adjacent to the bore, said bore having an enlargement positioned in the region between 50° and 90°, the 70° point being within the limits of said enlargement and having a further enlargement above the 180° point ample to accommodate the expanded temperature-indicating fluid in the sterilizing temperatures up to approximately 220°, etched lines across the tube at the 142°, 143°, and 145° positions, and a scale plate bearing graduations in single degree divisions of not less than $\frac{1}{16}$ inch and bearing temperature indications in numerals for the ranges of temperatures used in dairy work for cooling, preheating, and pasteurizing respectively, a line at 70° opposite the first-named enlargement of the thermometer tube, a word on the scale plate adjacent to said line to indicate the temperature appropriate for ageing, and panels delimiting and marked with words to identify them with the cooling, preheating, and pasteurizing ranges, respectively, all arranged and assembled within a scale case of limited length of the order of 9 inches.

In testimony whereof we have hereunto set our hands.

ROBERT M. WILHELM.
DONALD C. LIGHTNER.